(12) United States Patent
Richard

(10) Patent No.: US 12,702,143 B2
(45) Date of Patent: Aug. 11, 2026

(54) TREATMENT PROCESSES AND SYSTEMS FOR IMPROVING THE TASTE CHARACTERISTIC OF GREEN COFFEE BEANS

(71) Applicant: Saltwinds Coffee Company Ltd., Douglas (CA)

(72) Inventor: Laura Amanda Richard, Douglas (CA)

(73) Assignee: Saltwinds Coffee Company Ltd., Douglas (CA)

( * ) Notice: Subject to any disclaimer, the term of this patent is extended or adjusted under 35 U.S.C. 154(b) by 0 days.

(21) Appl. No.: 19/013,797

(22) Filed: Jan. 8, 2025

(65) Prior Publication Data

US 2025/0143340 A1 May 8, 2025

Related U.S. Application Data

(63) Continuation of application No. PCT/CA2023/050750, filed on Jun. 1, 2023.

(60) Provisional application No. 63/428,264, filed on Nov. 28, 2022.

(51) Int. Cl.
*A23F 5/02* (2006.01)
*A23F 5/04* (2006.01)

(52) U.S. Cl.
CPC . *A23F 5/02* (2013.01); *A23F 5/04* (2013.01)

(58) Field of Classification Search
CPC ...... A23F 5/02; A23F 5/00; A23F 5/36; A23F 5/10; A23F 5/04
USPC .................... 426/629, 443, 432, 74, 595, 45
See application file for complete search history.

(56) References Cited

U.S. PATENT DOCUMENTS 1,822,227 A 9/1931 Louise et al.
2,119,329 A 5/1938 Heuser
4,985,271 A 1/1991 Neilson et al.
8,771,769 B2 * 7/2014 Smyth .................... A23L 11/03 426/289
9,364,012 B2 6/2016 Pellegrini
2015/0257405 A1 * 9/2015 Kelly ....................... A23F 5/02 426/595

FOREIGN PATENT DOCUMENTS

EP 0282762 A2 * 9/1988 .............. A23F 5/02
GB 686520 A 1/1953
JP 4287075 B2 7/2009

(Continued)

OTHER PUBLICATIONS

Bonnet Harry et al., EP-0282672, machine translation english, Sep. 21, 1988, pp. 1-5. (Year: 1988).*

(Continued)

*Primary Examiner* — Hong T Yoo

(57) ABSTRACT

Treatment processes and systems for improving the taste characteristic of green coffee beans are disclosed. One of the treatment processes includes a) providing an aqueous solution of water and inorganic salt, the aqueous solution having a salt concentration of at least 0.1 mol/L; b) exposing the green coffee beans to the aqueous solution until a mass of the green coffee beans has increased c) drying the green coffee beans with a bean dryer to produce dried green coffee beans comprising at least 0.3% inorganic salt by mass; and d) after said drying, storing the dried green coffee beans in a storage container.

12 Claims, 9 Drawing Sheets

(56) References Cited

FOREIGN PATENT DOCUMENTS

| | | | |
|---|---|---|---|
| JP | 2010166868 | A | 8/2010 |
| KR | 1020200103344 | A | 9/2020 |

OTHER PUBLICATIONS

Chujiao Liu et al., "Enhancing Robusta coffee aroma by modifying flavor precursors in the green coffee bean." Food Chemistry, vol. 281,(2019), pp. 8-17. Available Online: https://www.sciencedirect.com/science/article/pii/S0308814618321848.

Chujiao Liu et al. , "Modifying robusta coffee aroma by green bean chemical pre-treatment.", Food Chemistry, vol. 272 (2019), pp. 251-257. Available Online: https://www.sciencedirect.com/science/article/pii/S0308814618313888.

International Search Report and Written Opinion, mailed Aug. 18, 2023, International Application No. PCT/CA2023/050750, 10 pages.

Specialty Coffee Association, "SCA Standard 102-2024—Coffee Value Assessment: Sample Preparation and Tasting Mechanics", SCA Coffee Product Standard Series, 2024 (12 pages).

* cited by examiner

TREATMENT PROCESSES AND SYSTEMS FOR IMPROVING THE TASTE CHARACTERISTIC OF GREEN COFFEE BEANS

CROSS-REFERENCE TO RELATED APPLICATIONS

This application is a continuation of International Patent Application no. PCT/CA2023/050750 filed Jun. 1, 2023, which claims the benefit of U.S. Provisional Patent Application No. 63/428,264, filed Nov. 28, 2022, and the entire contents of both of which are incorporated herein by reference in their entirety.

FIELD

The teaching disclosed herein relates generally to treatment processes and system used to improve coffee taste. In particular, the teaching disclosed herein relates to treatment processes and systems for improving the taste characteristic of green coffee beans through exposure to inorganic salt.

INTRODUCTION

Coffee is one of the world's most popular drinks. It is estimated that between 30-40% of the world's population consume coffee every day. Coffee is typically brewed by introducing roasted and ground coffee beans to water which extracts and dissolves the soluble material in the roasted and ground coffee beans.

Globally, there are three primary coffee bean growing regions-Central and South America, Africa, and Southeast Asia. Each of these regions is located along the equatorial zone between the Tropic of Cancer and the Tropic of Capricorn, commonly referred to as the "Bean Belt". There are four main types of coffee beans: *Arabica, Robusta, Excelsa* and *Liberica*. Each has a different taste characteristic from the others.

The coffee beans that have been picked and processed are green, and only take on their familiar brown colour due to the roasting process. Roasting brings out the aroma and flavour that is locked inside the green coffee beans. Green coffee beans tend to be roasted close to where they will be consumed, as green coffee beans are more stable than roasted coffee beans. Most green coffee beans are roasted commercially on a large scale, but small-scale commercial roasting has grown significantly with the trend toward "single-origin" coffees served at specialty shops.

SUMMARY

The following summary is intended to introduce the reader to various aspects of the applicant's teaching, but not to define any invention.

In one aspect, a treatment process for improving the taste characteristic of green coffee beans is disclosed. The treatment process includes a) providing an aqueous solution of water and inorganic salt, the aqueous solution having a salt concentration of at least 0.1 mol/L; b) exposing the green coffee beans to the aqueous solution until the green coffee beans comprise at least 0.3% inorganic salt by mass; c) drying the green coffee beans with a bean dryer; and d) after said drying, roasting the green coffee beans in a bean roaster to produce roasted coffee beans.

In another aspect, a treatment process for improving the taste characteristic of green coffee beans is disclosed. The treatment process includes a) providing an aqueous solution of water and inorganic salt, the aqueous solution having a salt concentration of at least 0.1 mol/L; b) exposing the green coffee beans to the aqueous solution until a mass of the green coffee beans has increased by at least 1.5%; c) drying the green coffee beans with a bean dryer; and d) after said drying, storing the green coffee beans in a storage container.

In another aspect, a treatment process for improving the taste characteristic of green coffee beans is disclosed. The treatment process includes a) providing an aqueous solution of water and inorganic salt, the aqueous solution having a salt concentration of at least 0.1 mol/L; b) exposing the green coffee beans to the aqueous solution until a mass of the green coffee beans has increased; c) drying the green coffee beans with a bean dryer to produce green coffee beans comprising at least 0.3% inorganic salt by mass; and d) after said drying, storing the green coffee beans in a storage container.

In another aspect, a treatment process for improving the taste characteristic of green coffee beans is disclosed. The treatment process includes a) loading the green coffee beans into one or more air-permeable bean containers; b) positioning the one or more air-permeable bean containers within 1 km of a coastline of a body of natural salt water; c) after said positioning, exposing the green coffee beans held in the one or more air-permeable bean containers to moisture-laden air comprising natural inorganic salt for an exposure duration of at least 1 week; and d) after said exposing, transporting the green coffee beans to a bean processing facility.

In another aspect, a treatment system for improving the taste characteristic of green coffee beans is disclosed. The system includes a green coffee bean hopper, a salt infuser, and a bean dryer positioned downstream of the salt infuser. The green coffee bean hopper has a bean storage volume and a bean hopper outlet downstream of the bean storage volume. The salt infuser is positioned downstream of the bean hopper outlet. The salt infuser includes an aqueous inorganic salt solution reservoir. The salt infuser is configured to expose green coffee beans received from the bean hopper outlet to the contents of the aqueous inorganic salt solution reservoir.

In another aspect, a roasted coffee bean comprising at least 0.3% inorganic salt by mass is disclosed.

Other aspects and features of the teachings disclosed herein will become apparent to those ordinarily skilled in the art, upon review of the following description of the specific examples of the present disclosure.

DRAWINGS

For a better understanding of the described examples and to show more clearly how they may be carried into effect, reference will now be made, by way of example, to the accompanying drawings in which.

Figure 1:
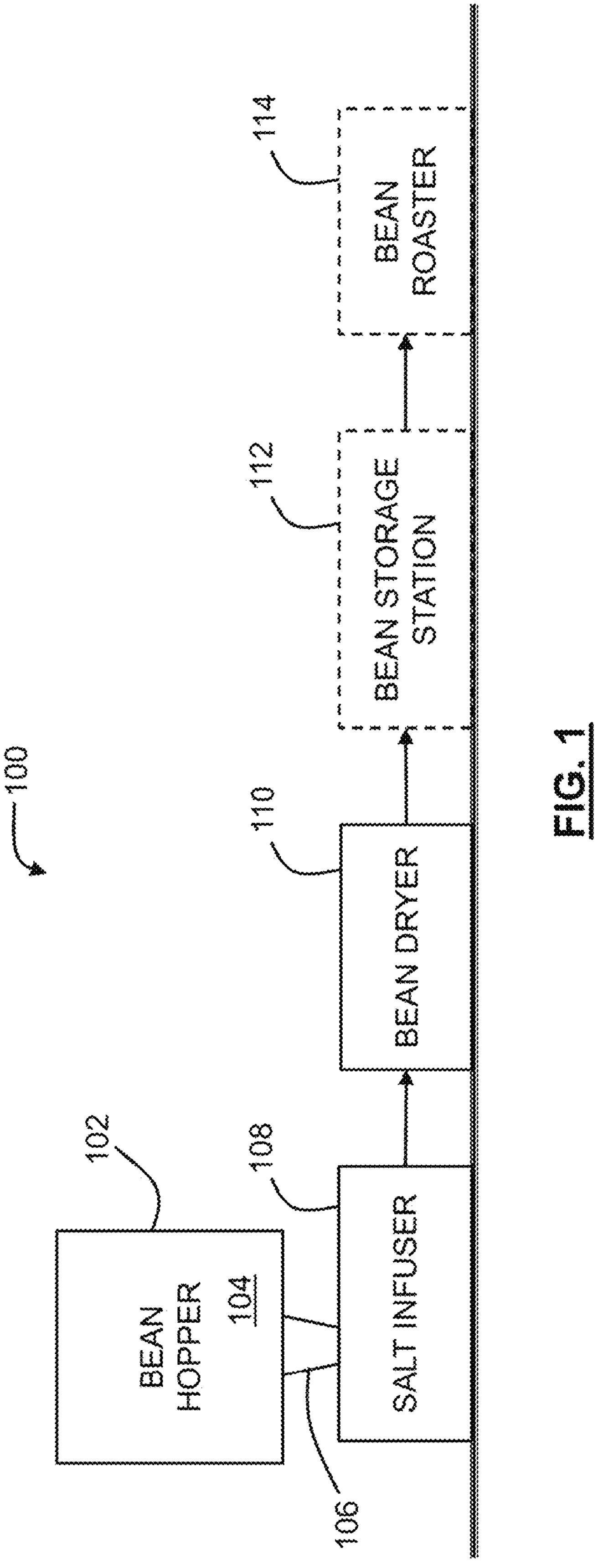
FIG. 1 is a schematic illustration of a green coffee bean treatment system according to aspects of the teaching disclosed herein.

The drawings included herewith are for illustrating various examples of apparatuses and methods of the teaching of the present specification and are not intended to limit the scope of what is taught in any way.

DETAILED DESCRIPTION

Various apparatuses or processes will be described below to provide an example of each claimed invention. No example described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an example of any claimed invention. Any invention disclosed in an apparatus or process described below that is not claimed in this document may be the subject matter of another protective instrument, for example, a continuing patent application, and the applicants, inventors, or owners do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

The terms "including", "comprising", and variations thereof mean "including but not limited to", unless expressly specified otherwise. A listing of items does not imply that any or all of the items are mutually exclusive, unless expressly specified otherwise. The terms "a", "an", and "the" mean "one or more", unless expressly specified otherwise.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

Referring to FIG. 1, a treatment system 100 in accordance with aspects of the teaching disclosed herein is used to improve the taste characteristic of green coffee beans. In the illustrated example, the treatment system 100 includes a green coffee bean hopper 102, a salt infuser 108 downstream of the green coffee bean hopper 102, and a bean dryer 110 downstream of the salt infuser 108.

The treatment system 100 may be used to improve the taste of brewed coffee upstream of the brewing process. At a high level, the treatment system 100 treats green coffee beans by exposing them to an aqueous inorganic salt solution. The treated coffee beans are then roasted and used to prepare brewed coffee for consumption. Brewed coffee derived from the green coffee beans treated by the treatment system 100 has a noticeably improved taste compared to that derived from the same green coffee beans without being treated by the treatment system 100.

The improvement in taste is due at least in part to a decrease in bitterness. The presence of inorganic salt in coffee beans alters the taste of bitter compounds when those coffee beans are used in brewing (i.e., the inorganic salt masks the taste of bitterness flavours). In some cases, the presence of inorganic salt suppresses the development of bitter flavours as the treated green beans are roasted. The suppression and/or masking of bitter flavours may improve the taste of the brewed coffee in and of itself (e.g., the brewed coffee is smoother and easier to drink).

In addition, the suppression and/or masking of bitter flavours may improve the taste of brewed coffee by increasing the perception of sweetness (i.e., sweet flavours are no longer masked by bitter flavours). Alternatively, or in addition, the suppression and/or masking of bitter flavours may improve the taste of brewed coffee by making the complex flavours of the roasted bean more noticeable (i.e., complex flavours are no longer masked by bitter flavours). Green coffee beans with a higher inherent bitterness generally sell for less than green coffee beans with a lower inherent bitterness. As such, use of the treatment system 100 and treatment processes described herein below may increase the market value of typically cheap green coffee beans by suppressing and/or masking bitter flavours in these coffee beans while roasting.

The bean hopper 102 has a bean storage volume 104, and a bean hopper outlet 106 downstream of the bean storage volume 104. Green coffee beans are held in the bean storage volume 104. In the illustrated example, the bean hopper outlet 106 controllably releases the green coffee beans held in the bean storage volume 104 into the salt infuser 108. In some examples, green coffee beans may be manually transferred from the bean hopper 102 to the salt infuser 108 (e.g., using a bean scooper, bucket, or the like). The bean hopper outlet 106, in such examples, may be an opening in the bean hopper 102 that provides access to the bean storage volume 104.

Figure 2:
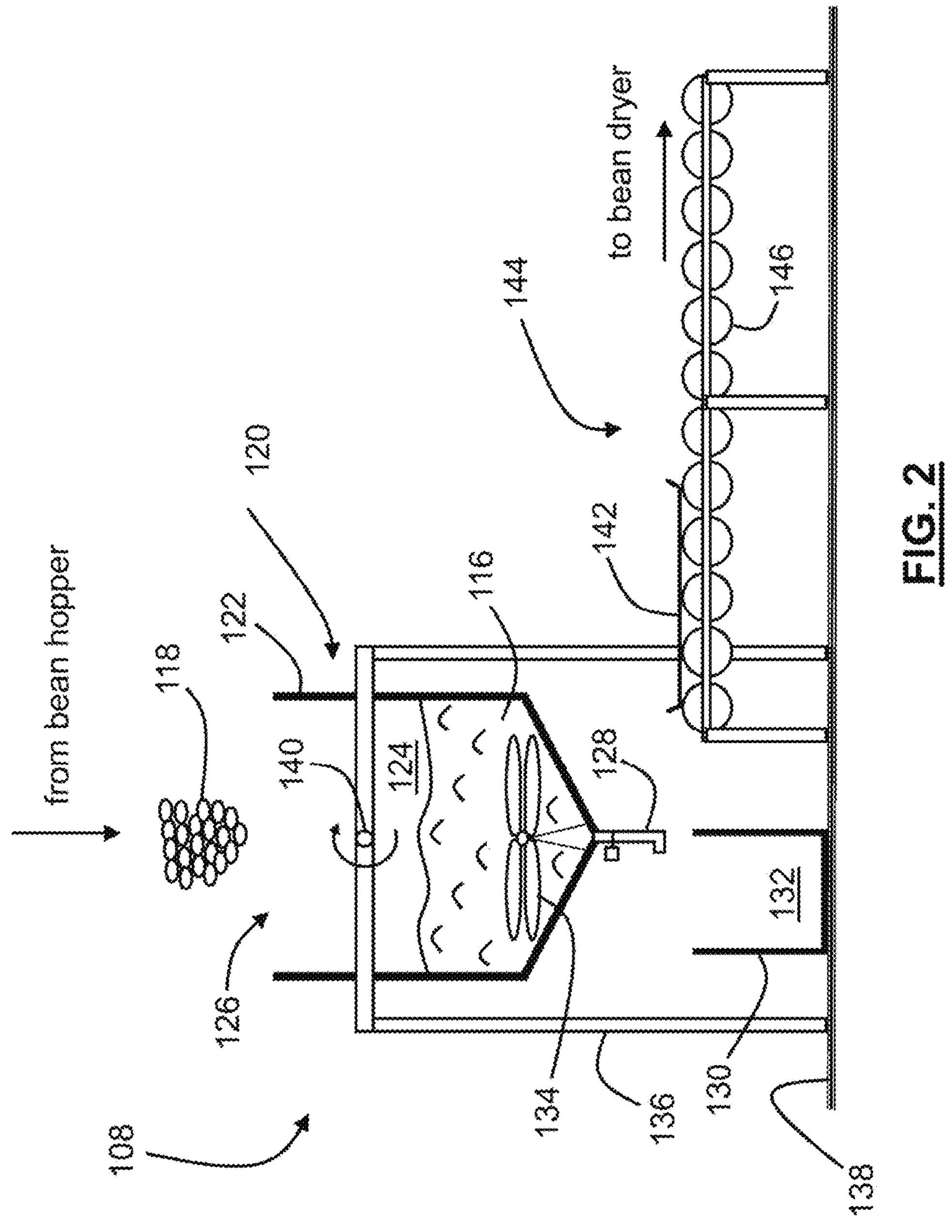
FIG. 2 is a schematic illustration of an example salt infuser that may be used in the green coffee bean treatment system of FIG. 1.
Figure 3:
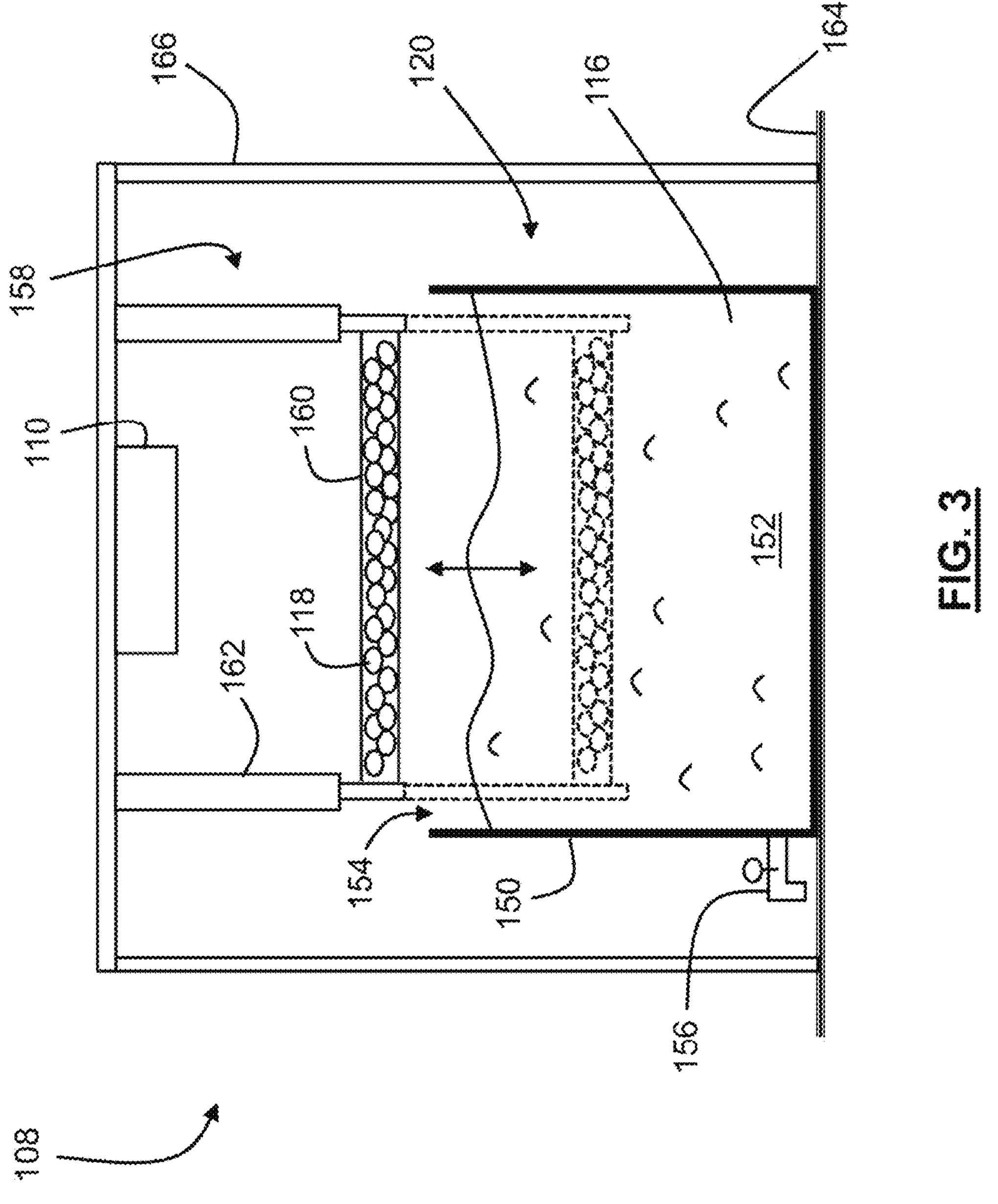
FIG. 3 is a schematic illustration of another example salt infuser that may be used in the green coffee bean treatment system of FIG. 1.
Figure 4:
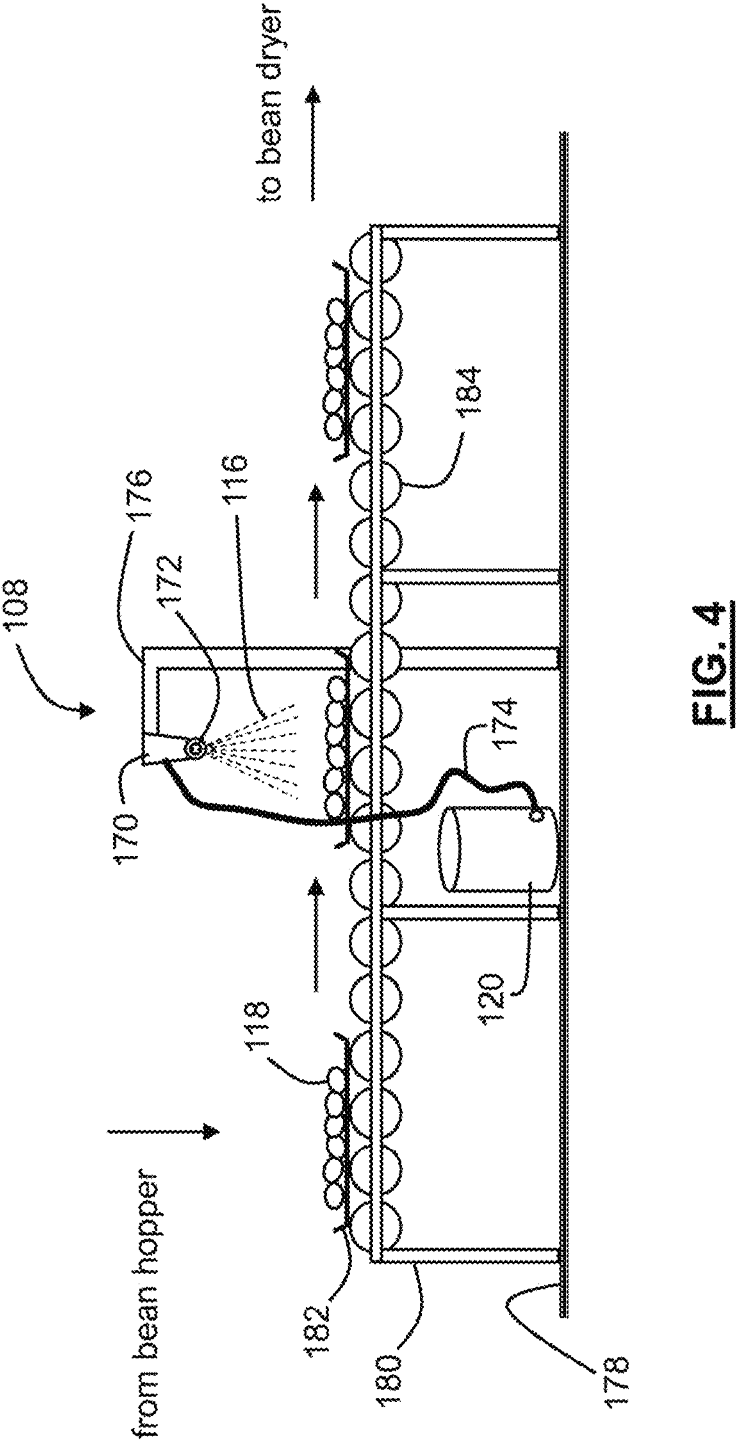
FIG. 4 is a schematic illustration of another example salt infuser that may be used in the green coffee bean treatment system of FIG. 1.

The salt infuser 108 is positioned downstream of the bean hopper outlet 106. The salt infuser 108 includes an aqueous inorganic salt solution reservoir 120 (FIGS. 2-4). The salt infuser 108 is configured to expose green coffee beans received from the bean hopper outlet 106 to the contents of the aqueous inorganic salt solution reservoir 120. The reservoir 120 holds an aqueous solution of water and inorganic salt (e.g., sodium chloride, potassium chloride, etc.). The aqueous solution may also be referred to herein as an "aqueous inorganic salt solution". As disclosed in more detail subsequently herein, the salt infuser 108 may be used to soak the green coffee beans in the aqueous solution (FIG. 2), repeatedly dip the green coffee beans in the aqueous solution (FIG. 3), and/or spray the green coffee beans with the aqueous solution (FIG. 4).

Reference is now made to FIG. 2, which illustrates an example of a salt infuser 108. In the illustrated example, the salt infuser 108 is configured to soak green coffee beans 118 received from the bean hopper outlet 106 (FIG. 1) in an aqueous inorganic salt solution 116. The aqueous inorganic salt solution reservoir 120 includes a salt exposure tank 122 having a tank volume 124 that holds the aqueous inorganic salt solution 116. In some examples, the tank volume 124 has a capacity of at least 10 L (e.g., at least 15 L, at least 20 L, or more). In some examples, the tank volume 124 has a capacity between 50 L and 5,000 L. Larger volumes (e.g., at least 50 L) may allow for treatment of green coffee beans 118 on a larger scale and mass distribution. Smaller volumes (e.g., less than 25 L) may allow for a more compact salt infuser 108 suitable for home and local coffee shop usage.

The green coffee beans 118 are received by the tank volume 124. Within the tank volume 124, the received green coffee beans 118 are soaked in the aqueous inorganic salt solution 116 for a soaking duration suitable for infusing the green coffee beans with the aqueous inorganic salt solution 116. The green coffee beans 118 have a higher density than the aqueous inorganic salt solution 116. As a result, the green coffee beans 118 sink to the bottom of the tank volume 124 (i.e., ensuring that the entire surface of each green coffee bean 118 is exposed to the aqueous inorganic salt solution 116. In some examples, the soaking duration is between 15 seconds and 30 minutes. More preferably, the soaking duration is between 5 minutes and 15 minutes. While the green coffee beans 118 are soaking in the aqueous inorganic salt solution 116, at least a portion of the inorganic salt of the aqueous inorganic salt solution 116 is absorbed by the green coffee beans 118.

In the illustrated example, the salt exposure tank 122 includes an optional bean stirrer 134 that, when activated, mixes the contents of the tank volume 124. In use, activation of the bean stirrer 134 mixes the green coffee beans 118 within the aqueous inorganic salt solution 116 and thereby promotes a generally even exposure of the aqueous inorganic salt solution 116 over the surface of each green coffee bean 118. Alternatively, or in addition, activation of the bean stirrer 134 may promote a homogenous concentration of inorganic salt throughout the aqueous solution 116.

In the illustrated example, the salt exposure tank 122 includes an aqueous solution drain valve 128 fluidly connected to the tank volume 124. The drain valve 128 facilitates drainage of the aqueous inorganic salt solution 116 from the tank volume 124.

In the illustrated example, the salt infuser 108 further includes an optional aqueous inorganic solution discharge tank 130 positioned downstream of the aqueous solution drain valve 128. The discharge tank 130 has a discharge tank volume 132. When the aqueous inorganic solution drain valve 128 is opened, the aqueous inorganic salt solution 116 exits the tank volume 124 and collects in the discharge tank volume 132. The aqueous inorganic salt solution 116 that is collected in the discharge tank volume 132 can either be disposed of and/or reused (e.g., returned to the same salt exposure tank 122 or to a different salt exposure tank, optionally with additional salt to restore the salt concentration). In some examples, the salt infuser 108 does not include the discharge tank 130.

After soaking in the salt exposure tank 122, the green coffee beans 118 are separated from the aqueous inorganic salt solution 116 and moved to the bean dryer 110. Still referring to FIG. 2, the salt exposure tank 122 has a tank bean outlet 126 positioned downstream of the tank volume 124. In the illustrated example, the tank bean outlet 126 is an open upper end of the salt exposure tank 122 that provides access to the tank volume 124. Alternatively, or in addition, the tank bean outlet 126 may be a sealable access hatch located in a sidewall of the salt exposure tank 122. When opened, the access hatch provides access to the tank volume 124. Alternatively, or in addition, the tank bean outlet 126 may be a bean release valve located at a lower end of the salt exposure tank 122. When opened, the bean release valve provides an opening sized to accommodate release of the green coffee beans 118.

An operator may remove the green coffee beans 118 from the tank volume 124 via the tank bean outlet 126 with a bean scooper or another suitable bean removal tool. In some cases, the green coffee beans 118 are removed from the tank volume 124 after the aqueous inorganic salt solution 116 has been drained therefrom. In other cases, the green coffee beans 118 are removed from the tank volume 124 with the aqueous inorganic salt solution remaining therein. In such cases, the bean scooper or other suitable bean removal tool is preferably liquid permeable (e.g., perforated) to simplify separation of the green coffee beans 118 from the aqueous inorganic salt solution 116.

In the illustrated example, the salt exposure tank 122 is rotatable to facilitate removal of the green coffee beans 118 from the tank volume 124. With reference to FIG. 2, the salt exposure tank 122 is spaced above a floor 138 by a tank support frame 136. The salt exposure tank 122 is rotatably connected to the tank support frame 136 at a pivot joint 140.

In some examples, the salt exposure tank 122 can be rotated up to 180 degrees about the pivot joint 140. When the salt exposure tank 122 is substantially inverted, the green coffee beans 118 may fall out of the tank volume 124 via the open upper end under the force of gravity. In the illustrated example, the green coffee beans 118 are dumped from the salt exposure tank 122 onto a bean tray 142 positioned downstream of the tank bean outlet 126. The bean tray 142 may then be used to transport the green coffee beans 118 to the bean dryer 110 (FIG. 1). In some examples, the salt exposure tank 122 is rotated about 90 degrees about the pivot joint 140 and then an operator uses a bean scooper or other suitable bean extraction tool to pull the green coffee beans 118 out of the tank volume and onto the bean tray 142.

In the illustrated example, the bean tray 142 is supported above the floor 138 by a bean conveyor 144. The bean conveyor 144 may simplify transportation of the green coffee beans 118 to the bean dryer 110 (FIG. 1). The bean conveyor 144, in the illustrated example, includes a plurality of rollers 146. In some examples, the rollers 146 are driven (e.g., by an electric motor). In other examples, the rollers 146 are not driven. In such examples, an operator may apply an external force to the bean tray 142 to move the bean tray 142 over the plurality of rollers 146. In some examples, the bean conveyor 144 may include a conveyor belt instead of the plurality of rollers 146 and/or instead of the bean tray 142.

Reference is now made to FIG. 3, which illustrates another example of a salt infuser 108. In the illustrated example, the salt infuser 108 is configured to submerge green coffee beans 118 received from the bean hopper outlet 106 (FIG. 1) in an aqueous inorganic salt solution 116. The aqueous inorganic salt solution reservoir 120 includes a salt exposure tank 150 having a tank volume 152 that holds the aqueous inorganic salt solution 116. In some examples, the tank volume 152 has a capacity of at least 10 L (e.g., at least 15 L, at least 20 L, or more). In some examples, the tank volume 152 has a capacity between 50 L and 5,000 L. Larger volumes (e.g., at least 50 L) may allow for treatment of green coffee beans 118 on a larger scale and mass distribution. Smaller volumes (e.g., less than 25 L) may allow for a more compact salt infuser 108 suitable for home and local coffee shop usage.

The salt exposure tank 150 has a tank open upper end 154 that provides access to the tank volume 152. The salt infuser 108 includes a bean dipper 158 that, when activated, repeatedly dips the green coffee beans 118 into the tank volume 152 from the tank open upper end 154.

With reference to FIG. 3, the bean dipper 158 includes a liquid permeable (e.g., perforated) bean dipping enclosure 160, and an actuator 162 connected to the bean dipping enclosure 160. In the illustrated example, the actuator 162 is supported above the floor 164 by an actuator support frame 166 and extends downwardly toward the tank open upper end 154. Green coffee beans 118 received from the green coffee bean hopper 102 are deposited (e.g., loaded) in the bean dipping enclosure 160. For example, the bean dipping enclosure 160 may have a lid that can be opened to deposit the green coffee beans 118.

The actuator 162, when activated, is configured to move the bean dipping enclosure 160 between a bean dipped position (shown in broken lines in FIG. 3) and a bean removed position (shown in solid lines in FIG. 3). The bean dipped position is at a lower elevation than the bean removed position. The bean dipped position is within the salt exposure tank 150. When the bean dipping enclosure 160 is in the bean dipped position, the green coffee beans 118 held therein are submerged in the aqueous inorganic salt solution 116. While the green coffee beans 118 are submerged in the aqueous inorganic salt solution 116, at least a portion of the inorganic salt of the aqueous inorganic salt solution 116 is absorbed by the green coffee beans 118.

When the bean dipping enclosure 160 is in the bean removed position, the green coffee beans 118 held therein are external to the aqueous inorganic salt solution 116 contained in the tank volume 152. The bean removed position may be inside or outside of the salt exposure tank 150 so long as the bean dipping enclosure 160 is suspended above the aqueous inorganic salt solution 116.

The actuator 162 may remain in the bean dipping position for a submersion duration and in the bean removed position for a suspension duration. In some examples, the submersion duration is between 5 seconds and 5 minutes. In some examples, the suspension duration is between 5 seconds and 5 minutes.

The actuator 162 may be automated to move the bean dipping enclosure back and forth between the bean dipped position and the bean removed position (e.g., based on a program that specifies lengths of the submersion and suspension durations). For example, the actuator 162 may be programed to dip the green coffee beans 118 in the aqueous inorganic salt solution once or many times (e.g., up to 30 times). Alternatively, the actuator 162 may be moved manually between the bean dipped position and the bean removed position (e.g., by physical interaction with an operator).

In the illustrated example, the salt exposure tank 150 includes an aqueous solution drain valve 156 fluidly connected to the tank volume 152. The drain valve 156 facilitates drainage of the aqueous inorganic salt solution 116 from the tank volume 152. In some cases, the aqueous inorganic salt solution 116 is drained from the salt exposure tank 150 after treating one batch of green coffee beans 118 and is replaced with fresh aqueous inorganic salt solution before treating the next batch. In some cases, the same aqueous inorganic salt solution 116 is used to treat multiple batches of green coffee beans 118 before being drained and replaced with fresh aqueous inorganic salt solution. Optionally, the aqueous inorganic salt solution 116 may be replenished with water and/or inorganic salt to restore the inorganic salt concentration.

Reference is now made to FIG. 4, which illustrates another example of a salt infuser 108. In the illustrated example, the salt infuser 108 is configured to spray green coffee beans 118 received from the bean hopper outlet 106 (FIG. 1) with an aqueous inorganic salt solution 116.

The salt infuser 108 includes an aqueous solution sprayer 170 having a spray nozzle 172 fluidly connected to the aqueous inorganic salt solution reservoir 120. In the illustrated example, the aqueous inorganic salt solution reservoir 120 is a drum that holds the aqueous inorganic salt solution 116.

In the illustrated example, the aqueous solution sprayer 170 is supported above a floor 178 by a sprayer support post 176 and the spray nozzle 172 is oriented to spray the aqueous inorganic salt solution 116 at the green coffee beans 118 below. In some examples, the spray nozzle 172 has multiple settings to vary the dispersion pattern of the aqueous inorganic salt solution 116 (e.g., mist, jet, shower, etc.).

In the illustrated example, the spray nozzle 172 and the aqueous inorganic salt solution reservoir 120 are fluidly connected by a hose 174. Aqueous inorganic salt solution 116 can flow from the reservoir 120, through the hose 174, to the spray nozzle 172. In some examples, the salt infuser 108 may include a pump operable to control flow of the aqueous inorganic salt solution 116 from the reservoir 120 to the spray nozzle 172. In some examples, the aqueous inorganic salt solution reservoir 120 is positioned at a higher elevation than the spray nozzle 172 so that the aqueous inorganic salt solution 116 may flow from the reservoir 120 to the spray nozzle 172 under the force of gravity.

In the illustrated example, a bean conveyor 180 is used to transport the green coffee beans 118 from the bean hopper outlet 106 (FIG. 1) to the salt infuser 108. In some examples, green coffee beans 118 are released from the bean hopper outlet 106 and land on the bean conveyor 180 which transports the green coffee beans 118 to the salt infuser 108. In the illustrated example, green coffee beans 118 received from the bean hopper outlet 106 are placed on a bean tray 182. In some examples, the bean tray 182 can be positioned below the bean hopper outlet 106 so that green coffee beans 118 released from the bean hopper outlet 106 are received by the bean tray 182. In some examples, an operator may transfer green coffee beans 118 released from the bean hopper outlet 106 to the bean tray 182 (e.g., using a bucket, shovel or the like).

The bean conveyor 180, in the illustrated example, includes a plurality of rollers 184. In some examples, the rollers 184 are driven (e.g., by an electric motor). In other examples, the rollers 184 are not driven and an operator may apply a force to the bean tray 182 to move the bean tray 182 over the plurality of rollers 184. In some examples, the bean conveyor 180 may include a conveyor belt instead of the plurality of rollers 184 and/or the bean tray 182.

To spray the green coffee beans 118, the aqueous solution sprayer 170 is activated when the green coffee beans 118 are positioned in the spray path of the aqueous inorganic salt solution 116. In the illustrated example, the bean tray 182 containing green coffee beans 118 is stopped below the spray nozzle 172 for a spraying duration of between 15 seconds and 30 minutes. For example, the bean conveyor 180 may be programmed to stop for the spraying duration when the green coffee beans 118 are detected below the spray nozzle 172. Alternatively, for a non-driven bean conveyor 180, an operator may manually position the bean tray 182 in the spray path of the spray nozzle 172. At least a portion of the inorganic salt of the aqueous inorganic salt solution 116 sprayed on the green coffee beans 118 is absorbed by the green coffee beans 118.

Referring again to FIG. 1, the bean dryer 110 is positioned downstream of the salt infuser 108. The green coffee beans 118 are wet upon exiting the salt infuser 108. The bean dryer 110 is used to dry the wet green coffee beans 118 received from the salt infuser 108. The green coffee beans 118 are generally dried until the moisture content therein is reduced below a microorganism growth threshold (e.g., below 10% moisture by mass). Green coffee beans 118 that are not dried to a moisture content below the microorganism growth threshold risk bacteria and/or mold developing on the beans prior to roasting.

The bean dryer 110 may be any device capable of drying the wet green coffee beans received from the salt infuser 108. For example, the bean dryer 110 may be a fan oven, a convection dryer, an electric heater, a dehydrator, a powerful blower (e.g., for mechanical drying), etc. In one example, the wet green coffee beans 118 received from the salt infuser 108 may be spread into a single layer on an aluminum pan and then inserted into a fan oven. In another example, the wet green coffee beans 118 received from the salt infuser 108 may be kept on the bean tray 142 (FIG. 2) and passed through a series of electric heaters using the bean conveyor 144 (FIG. 2). In such examples, the bean tray 142 may be air permeable, such as a wire mesh tray for example. The air permeable tray allows warm air to circulate around the green coffee beans 118 and can improve drying speeds compared to other trays that do not allow air to pass through.

In another example, the wet green coffee beans 118 received from the salt infuser 108 may be kept on bean tray 182 (FIG. 4) and transported to a convection dryer using the bean conveyor 180 (FIG. 4). The bean tray 182 (with the wet green coffee beans 118 held thereon) may then be inserted into the convection dryer. In such examples, the bean tray 182 may be air permeable, such as a wire mesh tray for example, to facilitate air circulation around the green coffee beans 118. Alternatively, the wet green coffee beans 118 may be transferred onto a different tray or container suitable for insertion into the convection dryer.

Figure 5:
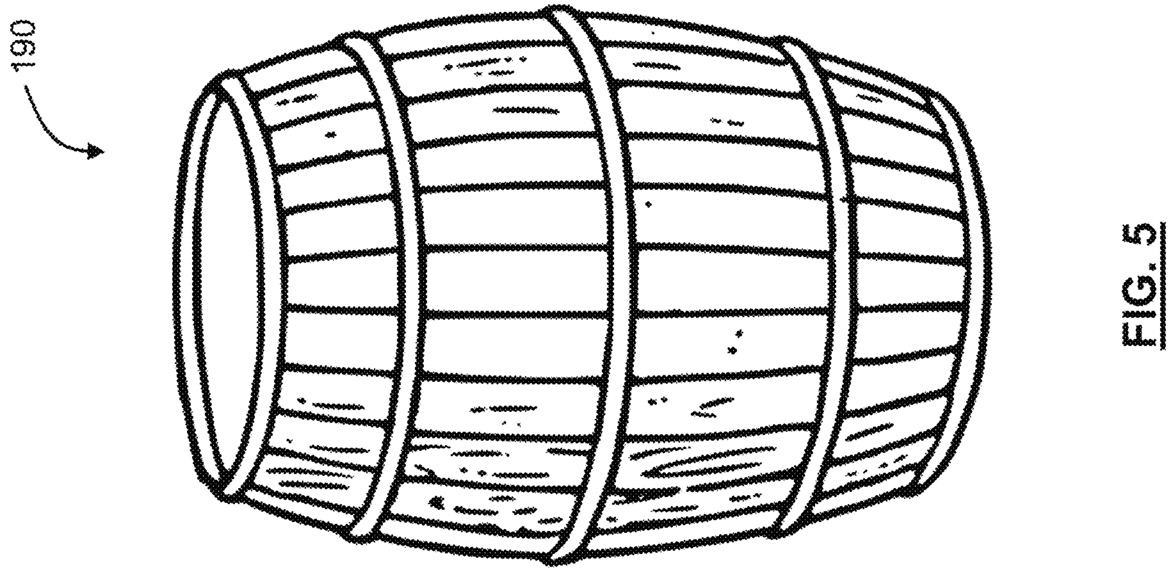
FIG. 5 is a perspective view of a bean storage container according to aspects of the teaching disclosed herein.

In the illustrated example, the treatment system 100 further includes an optional bean storage station 112 positioned downstream of the bean dryer 110. At the bean storage station 112, the green coffee beans 118 received from the bean dryer 110 may be loaded into one or more bean storage containers. The storage container(s) may be any suitable container for holding green coffee beans until it is time for those beans to be roasted (e.g., barrels, sacks, vats, bags, etc.). FIG. 5 shows an example bean storage container 190 that may be used to store the green coffee beans received from the bean dryer 110. In the example illustrated, the bean storage container 190 is a wood barrel. In some examples, the bean container 190 is a burlap sack. The bean storage container 190 may be kept on site (e.g., at a home, coffee shop, or factory) until ready to be roasted, or shipped to customers (e.g., individual homes or coffee shops) who can open the container 190 when ready to roast them.

Returning to FIG. 1, In the illustrated example, the treatment system 100 further includes an optional bean roaster 114 positioned downstream of the bean storage station 112. The bean roaster 114 can be any suitable device for roasting green coffee beans. For the example, the bean roaster 114 may be a drum roaster, hot-air roaster, centrifugal roaster, etc., that operates in either batch or continuous modes.

In the illustrated example, the bean roaster 114 appears to be located near the other components of the treatment system 100. For example, the bean roaster 114 may be in the same facility as the other components of the treatment system 100 (e.g., the salt infuser 108, the bean storage station 112, etc.). Such an arrangement may be advantageous from an efficiency perspective as transportation of the green coffee beans is kept to a minimum. In other examples, the bean roaster 114 may be in a different facility than the other components of the treatment process 100. In such examples, the green coffee beans 118 can be transported (e.g., by truck, rail, ship, etc.) to the other facility within the storage container 190 (FIG. 5).

In some examples, the treatment system 100 does not include the bean dryer 110 and the bean storage station 112. In such examples, the bean roaster 114 receives the green coffee beans 118 from the salt infuser 108. Such arrangements can be advantageous when the green coffee beans 118 are roasted shortly after exiting the salt infuser 108 (e.g., within 48-96 hours). Substantial microorganism growth begins after approximately 96 hours have elapsed from the time that the wet green coffee beans 118 exited the salt infuser 108. This duration is highly dependent on ambient temperature and moisture content of the green coffee beans, and may be lower in some cases (e.g., 48-72 hours). Therefore, green coffee beans 118 that are roasted before substantial microorganism growth begins may not need to be dried to a moisture content below the microorganism growth threshold.

Figure 6:
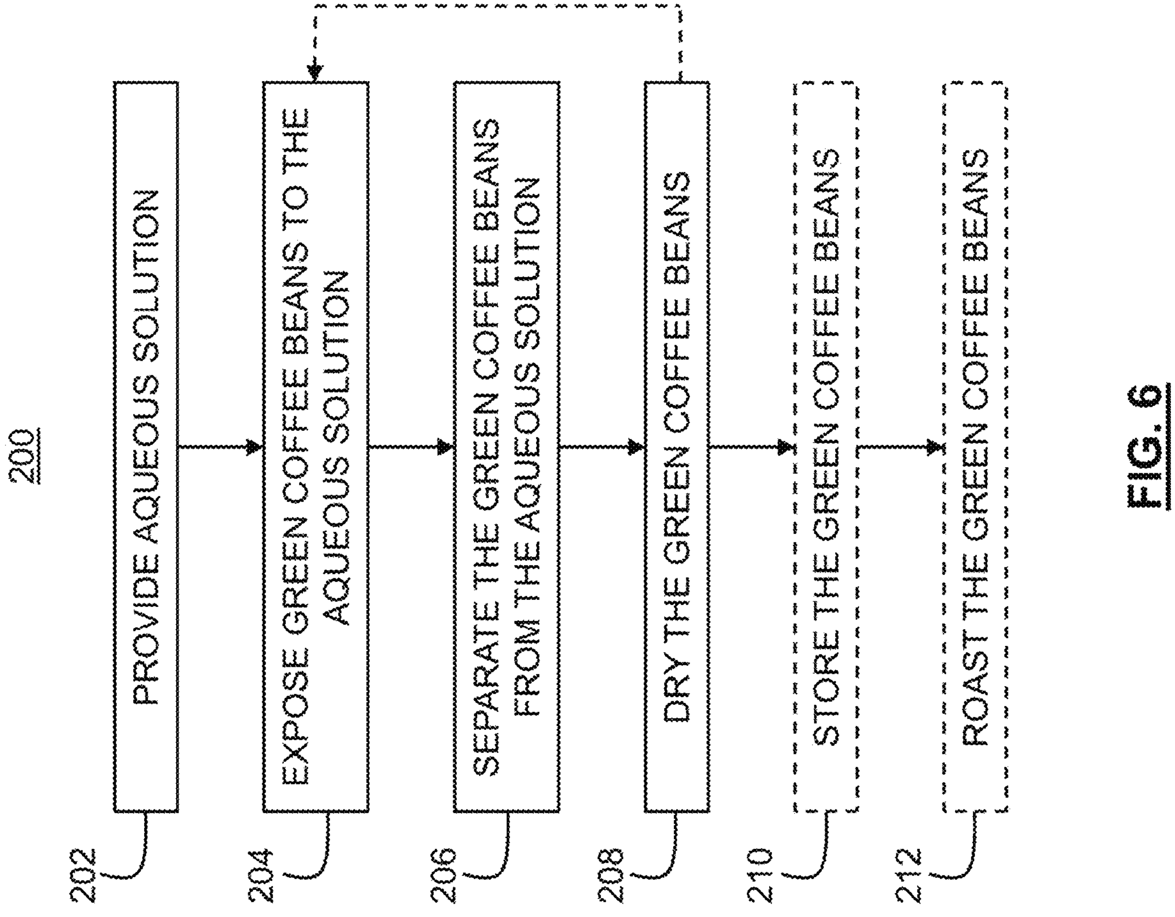
FIG. 6 is a flowchart illustrating a green coffee bean treatment method according to aspects of the teaching disclosed herein.

Reference is now made to FIG. 6, which illustrates a treatment process 200 for improving the taste characteristic of green coffee beans in accordance with aspects of the teaching disclosed herein.

At step 202, the method includes providing an aqueous solution of water and inorganic salt (e.g., see the aqueous inorganic salt solution 116 in FIGS. 2-4). The aqueous solution has an inorganic salt concentration of between 0.1 mol/L and 5.2 mol/L. In some examples, the inorganic salt concentration is between 0.1 mol/L to 1.2 mol/L. More preferably, the inorganic salt concentration is between 0.25 mol/L and 0.75 mol/L. In some examples, the inorganic salt concentration may closely align with the inorganic salt concentration of sea water (approximately 0.6 mol/L).

As used herein, inorganic salt explicitly excludes all amino acid salts. In some examples, the inorganic salt comprises one or more of sodium chloride (NaCl), potassium chloride (KCl), magnesium chloride ($MgCl_2$), and calcium chloride ($CaCl_2$)). In some examples, the inorganic salt is natural sea salt (which is generally made up of at least 90% NaCl, along with some other inorganic minerals, such as phosphorus, zinc, iron, and silicon, for example). In some examples, the inorganic salt comprises one or more alkali salts.

At step 204, the treatment process includes exposing the green coffee beans to the aqueous solution. Step 204 may include exposing the green coffee beans to the aqueous solution using the salt infuser 108 (FIG. 1). In some examples, the green coffee beans are exposed to the aqueous solution until a mass of the green coffee beans has increased by at least 1.5% (e.g., at least 2%, at least 2.5%, at least 5%, or more). This may indicate that the quantity of inorganic salt that has infused the green coffee beans is sufficient to achieve the desired improvement in flavor characteristic. To measure the mass increase of the green coffee beans, a sample of green coffee beans (e.g., 5-15 beans) are weighted prior to being exposed to the aqueous solution. These green coffee beans are then exposed to the aqueous solution at step 204. After exposure, any aqueous surface solution on the beans' surfaces is wiped off with a towel and the coffee beans are reweighed. The weight of the green coffee beans after exposure to the aqueous solution is divided by the weight of the green coffee beans prior to being exposed to the aqueous solution.

In some examples, step 204 includes exposing the green coffee beans to the aqueous solution until they contain at least a target quantity of inorganic salt (e.g., at least 0.3% inorganic salt by mass, at least 0.4% inorganic salt by mass, at least 0.5% inorganic salt by mass). As an example, with NaCl as the inorganic salt, the target quantity is 0.3% of NaCl by mass. Prior to the exposing at step 204, the green coffee beans comprise less than 0.1% inorganic salt by mass.

The green coffee beans can be sent to a lab to measure their salt content after the exposure at step 204. It is not important that these salt measurements be done in-situ (e.g., repeated measurements to determine when the exposure of the green coffee beans to the aqueous inorganic salt solution can be stopped). More practically, a few test batches with different treatment parameters (e.g., soaking durations, inorganic salt concentration, etc.) can be sent to the lab for testing. From the results, the treatment parameters can be set so that the green coffee beans contain at least the target quantity of inorganic salt at the end of step 204. Periodic testing (e.g., weekly, or monthly) may be performed to verify that the target quantity of inorganic salt is being reached with the set treatment parameters.

During step 204, the green coffee beans absorb (e.g., take in) at least a portion of the inorganic salt of the aqueous solution. the green coffee beans are roasted, the absorbed inorganic salt can alter the chemical reactions responsible for unlocking the aroma and flavour inside the green coffee beans. In some cases, the presence of the inorganic salt during roasting suppresses the development of bitter flavours and thereby improves the taste of the coffee brewed from these coffee beans.

In some examples, the green coffee beans have a Q-score below 80 before exposure to the aqueous solution at step 204. This means that if the green coffee beans were roasted and used to produce brewed coffee (i.e., in the traditional manner, without being exposed to the aqueous solution at step 204), the brewed coffee would have a Q-score below 80. The Q-score is a standard, internationally recognized metric that quantifies the taste of brewed coffee. The Q-score considers several key taste contributors in brewed coffee, including aroma, flavour, aftertaste, acidity, body, balance, uniformity, and sweetness. Prior to assigning a Q-Score, the green coffee beans are roasted according to a specific roasting protocol and then brewed according to a specific brewing protocol to produce consumable coffee. A Q-score of 80 or higher is recognized as a premium or specialty grade coffee. A Q-score of less than 80 indicates that the coffee is not premium grade. Green coffee beans that produce a brewed coffee with a Q-score of 80 or higher generally command higher prices than green coffee beans that produce a brewed coffee with a Q-score less than 80.

The treatment process 200 is particularly beneficial for green coffee beans that produce brewed coffee with a Q-score less than 80. All else being equal, the lower the Q-score, the greater the improvement the treatment process 200 may have on the taste characteristics of those green coffee beans. A smooth tasting, non-bitter coffee generally requires the use of premium beans with a Q-score of 80 or higher, roasted with fine-tuned precision in small batches by a craft roaster. Less expensive coffee beans are typically those that have a higher inherent bitterness. So-called "commodity coffee", roasted in large batches in a continuous production environment, often have a bitter aftertaste and less complex flavours due to process standardization and the use of non-premium coffee beans. In one aspect, the treatment process 200 provides a solution to producing premium tasting brewed coffee from a non-premium coffee bean (e.g., Q-score below 80). Accordingly, treatment process 200 may increase the market value of non-premium coffee beans (e.g., having a Q-score below 80).

Step 204 may include soaking the green coffee beans in the aqueous solution for a soaking duration of at least 15 seconds. For example, with reference to FIG. 2, the green coffee beans 118 may be soaked in the aqueous solution 116 held in the salt exposure tank 122. In some examples, the soaking duration is between 15 seconds and 30 minutes. More preferably, the soaking duration is between 5 minutes and 15 minutes. Too short a soaking duration may not provide enough time for adequate absorption of the inorganic salt and too long a soaking duration may either be inefficient (waste time) or result in too much absorption of the inorganic salt (particularly where a high inorganic salt concentration is used to accelerate the absorption rate). Over absorption of the inorganic salt long may also result in the coffee brewed form those green coffee beans tasting noticeably salty (which is not desired).

In some examples, the soaking at step 204 includes continuously stirring the green coffee beans and the aqueous solution within a salt exposure tank. For example, with reference to FIG. 2, the salt exposure tank 122 includes a bean stirrer 134 that, when activated, stirs the aqueous solution 116 and green coffee beans 118 in the tank volume 124.

Alternatively, step 204 may include dipping the green coffee beans in the aqueous solution. The green coffee beans may be dipped between 1 and 30 times. In some examples the green coffee beans are dipped in the aqueous solution at least two times (e.g., at least three times, at least four times, or more). Too few dips may not provide enough time for an adequate amount of the inorganic salt to diffuse into the green coffee beans. In contrast, too may dips may destroy one of benefits of dipping over soaking, which is to decrease the combined exposure duration over all the dips in effort to reduce the loss of chemical compounds into the aqueous solution from the green coffee beans that contribute to taste.

The concentration of inorganic salt in the aqueous solution impacts the rate of inorganic salt absorption into the green coffee beans and the loss of flavor compounds from the green coffee beans into the aqueous solution. Inorganic salt from the higher salt concentration aqueous solution will naturally want to travel into the lower salt concentration of the green coffee beans. Flavour compounds naturally present in the green coffee beans will want to travel into the aqueous solution where there is none. The travel in both directions takes time. Dipping reduces some of this time as compared to soaking.

For example, with reference to FIG. 3, the green coffee beans 118 may be repeatedly dipped in the aqueous solution 116 held in the salt exposure tank 150 by the bean dipper 158. The dipping at step 204 includes submerging the green coffee beans 118 in the aqueous solution 116 and then separating the green coffee beans 118 from the aqueous solution 116 after a submersion duration.

In some examples, the submersion duration is between 5 seconds and 5 minutes. More preferably, the submersion duration is between 5 seconds and 1 minute. Dipping the green coffee beans in the aqueous solution at step 204 may be preferred to soaking because the relatively short submersion durations provide chemical compounds responsible for taste characteristics of the green coffee beans less time to leach out of the green coffee beans into the aqueous solution. Optionally, the green coffee beans 118 are dried (e.g., with the bean dryer 110) after each dip. For example, with reference to FIG. 3, the green coffee beans 118 may be dried with a bean dryer 110 when the actuator 162 is in the bean removed position.

Alternatively, step 204 may include spraying the green coffee beans with the aqueous solution. For example, with reference to FIG. 4, the green coffee beans 118 may be sprayed with the aqueous solution 116 using the aqueous solution sprayer 170. During the spraying at step 204, the aqueous solution 116 coats the surface of the green coffee beans 118. At least a portion of the aqueous solution 116 that coats the surface of the green coffee bean 118 is absorbed into the green coffee bean 118.

Step 204 may include spraying the green coffee beans with the aqueous solution for a spraying duration of at least 15 seconds. In some examples, the spraying duration is between 15 seconds and 30 minutes. More preferably, the spraying duration is between 5 minutes and 15 minutes. The green coffee beans 118 may be mixed periodically or continuously for the spraying duration to ensure a generally even application of the aqueous solution over their surface.

As discussed above, the rate at which inorganic salt/flavour compounds travel from the green coffee beans or the aqueous solution to the other depends on the difference of concentration. When the green coffee beans are submerged or soaked in the aqueous solution, there is a large volume of the aqueous solution. Diffusion of flavour compounds from the green coffee beans into the aqueous solution makes almost no difference to the concentration of flavor compounds in the aqueous solution, so the rate of loss of the flavour compounds continues essentially unchanged.

Spraying reduces exposure to the volume of aqueous solution used in soaking or dipping exposure techniques discussed above. As the flavour compounds travel into the aqueous solution, the concentration of flavor compounds in the aqueous solution increases substantially (because there is so little volume of the aqueous solution clinging to the surface of the green coffee beans), and this increase results in a drop in the concentration difference between the green coffee beans and the sprayed aqueous solution, which slows down the loss of flavor compounds to the aqueous solution.

Step 204 may also include flowing the aqueous inorganic salt solution over the green coffee beans. For example, the green coffee beans can be placed in a water-permeable container, such as, a burlap sack or wire mesh box. The water-permeable container is then positioned within a flow of the aqueous inorganic salt solution so that the aqueous inorganic salt solution passes over the green coffee beans. In some examples, the aqueous inorganic salt solution may be pumped in a continuous closed loop. In some examples, the aqueous inorganic salt solution may flow continuously from a large source, e.g., a body of brackish or saline water. In this context, the aqueous inorganic salt solution is natural saline water. Flowing the aqueous solution over the green coffee beans at step 204 provides a constant local inorganic salt concentration which can promote absorption of the inorganic salt into the green coffee beans.

At step 206, the treatment process includes separating the green coffee beans from the aqueous solution. For example, with reference to FIG. 2, the green coffee beans 118 may be separated from the aqueous solution 116 by draining the aqueous solution from the salt exposure tank 122 at the drain valve 128. Alternatively, the green coffee beans 118 may be separated from the aqueous solution 116 using a bean scooper while the aqueous solution 116 remains in the salt exposure tank 122. In examples where the salt infuser 108 includes the aqueous solution sprayer 170 (FIG. 4), separating the green coffee beans from the aqueous solution may involve at least one of i) moving the green coffee beans 118 out of the spray path of the spray nozzle 172 and ii) deactivating the aqueous solution sprayer 170 (i.e., turning it off).

At step 208, the treatment process includes drying the green coffee beans with a bean dryer (e.g., see the bean dryer 110 of FIG. 1) to produce dried green coffee beans. In some examples, the dried coffee beans comprise at least 0.3% inorganic salt by mass. In some examples, the dried coffee beans comprise between 0.3% and 1.5% inorganic salt by mass. Drying the green coffee beans at step 208 is performed after separating the green coffee beans from the aqueous solution at step 206. The bean dryer 110 may be a fan oven, a convection dryer, an electric heater, a dehydrator, or any other powered device capable of drying the green coffee beans.

The green coffee beans are generally dried at step 208 until the moisture content therein is reduced below a microorganism growth threshold (e.g., below 10% moisture by mass). In some examples, the green coffee beans are dried at step 208 to a moisture content between 2 and 10%. Green coffee beans that are not dried after being exposed to the aqueous solution at step 204 may experience bacterial and/or mold growth prior to roasting. In some examples, the green coffee beans are dried at step 208 for a drying duration of between 5 minutes and 120 minutes. More preferably, the drying duration is between 20 minutes and 70 minutes. The drying duration is based at least in part on the temperature of the air exposed to the green coffee beans during step 208. In some examples, the drying at step 208 includes exposing the green coffee beans to air having an air temperature between 50° C. and 200° C. More preferably, the air temperature is between 80° C. and 150° C. Too high an air temperature may prematurely start to roast the coffee beans and too low an air temperature may be inefficient (take too long to dry).

Optionally, the treatment process 200 includes repeating the exposing at step 204 and then repeating the drying at step 208. Repeating the exposing and drying steps may increase the amount of inorganic salt that is absorbed by the green coffee beans from the aqueous solution. In some examples, the exposing at step 204 and the drying at step 208 can be repeated between 2 and 12 times. More preferably, the exposing at step 204 and the drying at step 208 can be repeated between 2 and 4 times. When the exposing at step 204 and the drying at step 208 are repeated, they may be so repeated until the green coffee beans contain at least a target quantity of inorganic salt (e.g., at least 0.3% inorganic salt by mass, at least 0.4% inorganic salt by mass, at least 0.5% inorganic salt by mass). In some examples, the exposing at step 204 is repeated (e.g., at least two times) with the drying at step 208 only being performed once after the final exposure.

At step 210, the treatment process may optionally include storing the dried green coffee beans in a storage container. The storage container may be any suitable container for storing green coffee beans, such as, for example, a barrel, bag, vat, etc. An example storage container 190 is shown in FIG. 5.

Storing the green coffee beans at step 210 is performed after drying the green coffee beans with the bean dryer at step 208. When the green coffee beans are not dried before being put into the storage container, bacteria and/or mold may grow on the green coffee beans within the storage container and thereby spoil the green coffee beans. The green coffee beans are generally kept in a storage container until it is time for those green coffee beans to be roasted. In some examples, the green coffee beans are stored at step 210 for a storage duration of at least 24 hours (e.g., at least 48 hours, at least 96 hours, at least 168 hours, or more). The green coffee beans may be kept in the storage container for several weeks, or even several months before being roasted (at the same facility, or at an individual's home or at a coffee shop). Green coffee beans stored at a moisture content below the microorganism growth threshold can remain viable for roasting for an extended period amount of time. In some examples, the green coffee beans can be stored for over one year before they are roasted.

At step 212, the treatment process may optionally include roasting the green coffee beans in a bean roaster to produce roasted coffee beans. The bean roaster can be any suitable device for roasting green coffee beans. For example, the bean roaster may be a drum roaster, hot-air roaster, centrifugal roaster, etc., that operates in either batch or continuous modes. An example bean roaster 114 is shown schematically in FIG. 1.

Figure 9:
FIG. 9 is a schematic illustration of roasted coffee beans according to aspects of the teaching disclosed herein.

FIG. 9 illustrates roasted coffee beans 188. The roasted coffee beans comprise at least 0.3% inorganic salt by mass (at least 0.4% inorganic salt by mass, at least 0.5% inorganic salt by mass). In some examples, the roasted coffee beans 188 comprise between 0.3% and 1% inorganic salt by mass. If the roasted coffee beans comprise too much inorganic salt, the resulting brewed coffee may taste noticeably salty.

In some examples, roasting the green coffee beans at step 212 is performed after storing the green coffee beans at step 210. In some examples, roasting the green coffee beans at step 212 is performed after separating the green coffee beans from the aqueous solution at step 206 without drying and storing the green coffee beans in between (i.e., steps 208 and 210 omitted). Such processes may be advantageous where the roasting at step 212 begins shortly after the end of the separating at step 206 (e.g., within 48-96 hours). Substantial microorganism growth on a moist green coffee bean does not typically begin until about 96 hours have elapsed (this duration is highly dependent on ambient temperature and moisture content of the green coffee beans, and may be lower in some cases (e.g., 48-72 hours).

In some examples, the roasted coffee beans have a Agtron™ color measurement between 0 and 49. The Agtron™ colour measurement indicates a roast level for roasted coffee beans. Agtron™ analyzers are equipped with UV/Visible light sensors that can measure the roast level of roasted coffee beans. With the Agtron™ analyzer set to the "Gourmet" scale (a scale from 0 to 100), it is generally recognized that roasted coffee beans with a Agtron™ colour measurement from 50 to 100 are light to medium roasts, while coffee beans with a Agtron™ colour measurement from 0 to 49 are those ranging from medium-dark to very dark roasts. The Agtron™ colour measurements can be measured with any of the Agtron™ analyzers (e.g., M-series III, S-series III, E20-CP III, or M-Basic II).

The treatment process 200 is particularly beneficial for green coffee beans intended to be roasted to an Agtron™ colour measurement between 0 to 49 (medium dark to very dark roasts). All else being equal, the darker the roast, the more bitter the brewed coffee. The longer a coffee bean is roasted, the less dense and more soluble they become, increasing the likelihood over-extracting while brewing which is a reason why dark roast brewed coffee can taste bitter. As previously described, the presence of inorganic salt within the coffee beans masks the taste and/or suppresses the development of bitter flavours. Therefore, the treatment process 200 may be advantageously performed on green coffee beans destined to be roasted to an Agtron™ colour measurement of between 0 to 49 (e.g., medium dark to very dark roasts).

Optionally, after step 212, the treatment process may include the roasted coffee beans 188 (FIG. 9) being packaged for sale to customers (e.g., coffee shops and/or direct to consumer).

Figure 10:
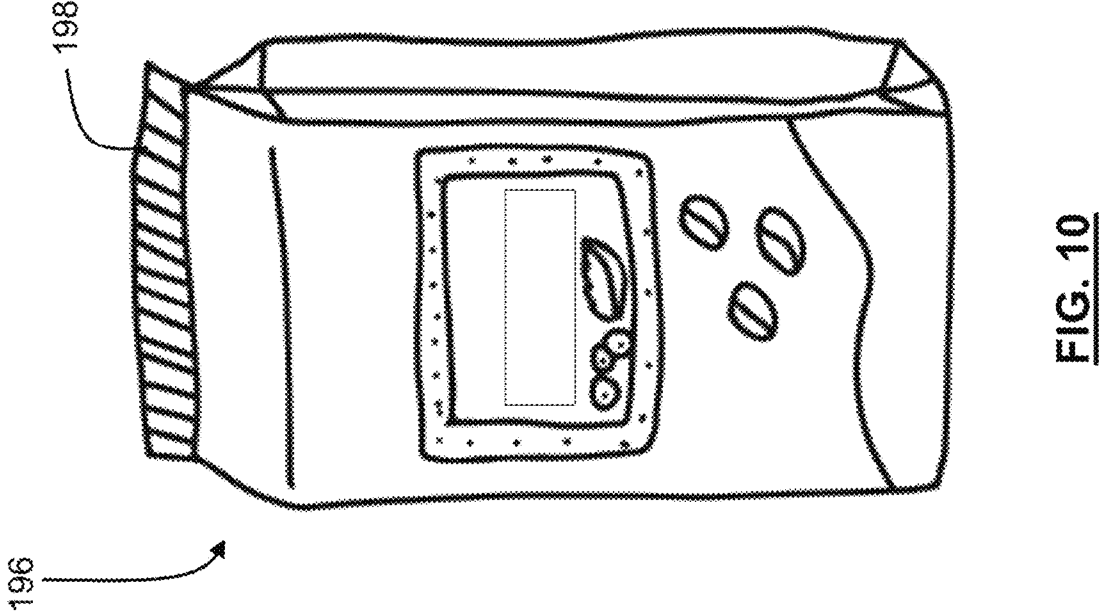
FIG. 10 is a front view of an example retail package that includes the roasted coffee beans of FIG. 9.

FIG. 10 illustrates an example retail package 196 that holds a predetermined quantity of roasted coffee beans. For example, the retail package 196 may hold at least 400 grams of the roasted coffee beans. The roasted coffee beans may be packaged as whole coffee beans 188 (e.g., FIG. 9). Alternatively, the roasted coffee beans may be ground prior to packaging. The retail package 196 is shown configured as a pouch with a sealable top portion 198. Various configurations are possible. For example, the retail package 196 may be alternatively configured as a container with an openable lid.

EXAMPLE 1

Two kilograms of green coffee beans sourced from the San Ignacio region of Peru were soaked in an aqueous solution of water and coarse sea salt. The aqueous solution had a sea salt concentration of 0.6 mol/L. As previously described sea salt is generally made up of at least 90% NaCl, along with some other minerals, such as phosphorus, zinc, iron, and silicon, for example. The green coffee beans were soaked in the aqueous solution for a soaking duration of 10 minutes and stirred continuously. The green coffee beans were removed from the aqueous solution and spread into a single layer on large aluminum pans. The green coffee beans were then dried on the aluminum pans in a fan oven set to 121° C. for a drying duration of 40 minutes. The green coffee beans were then roasted in a roasting drum to an Agtron™ colour measurement of approximately 45. Samples of the roasted green coffee beans that had undergone the treatment process were selected at random and analyzed using inductively coupled plasma mass spectrometry (ICP-MS). Samples of roasted green coffee beans that had not undergone the treatment process were also selected and analyzed using ICP-MS (i.e., as a control). The results in the table below indicate the mass of sodium (Na) detected in the roasted coffee beans. A leachate of each of the treated and untreated roasted coffee beans was also analyzed using ICP-MS. The leachates were created by swirling the respective roasted coffee beans in deionized water.

Results Table:

| Sample | Na (mg/kg) | NaCl (mg/kg) (calculated by Formula 1) | NaCl (wt %) (calculated by Formula 2) |
|---|---|---|---|
| Untreated coffee beans | <10 | <25 | 0 |
| Leachate from untreated coffee beans | <10 | <25 | 0 |
| Treated coffee beans | 2660 | 6762 | 0.68 |
| Leachate from treated coffee beans | 440 | 1118 | 0.11 |

It is assumed that all measured sodium (Na) is derived from sodium chloride (NaCl) in the aqueous solution. NaCl (mg/kg) and NaCl (wt %) are respectively calculated as follows:

Formula 1

$$\mathrm{NaCl}\left(\frac{mg}{kg}\right) = \frac{\mathrm{Na}\left(\frac{mg}{kg}\right)}{\text{molar mass of Na}\left(22.99\,\frac{g}{\mathrm{mol}}\right)} \times \text{molar mass of NaCl}\left(58.44\,\frac{g}{\mathrm{mol}}\right);$$

and

Formula 2

$$\mathrm{NaCl}\,(\mathrm{wt}\,\%) = \frac{\mathrm{NaCl}\left(\frac{mg}{kg}\right)}{10000}.$$

The results displayed in the above table show that the roasted coffee beans that had undergone treatment have an average of 2260 mg of sodium per kg of the coffee bean. In contrast, the roasted coffee beans that had not undergone treatment contained a negligible amount of sodium (under 10 mg/kg which is less than the detection limit of the device used to perform the ICP-MS). The results indicate that the green coffee beans absorb a substantial amount of the sodium chloride (NaCl) from the aqueous solution during the treatment process.

Figure 7:
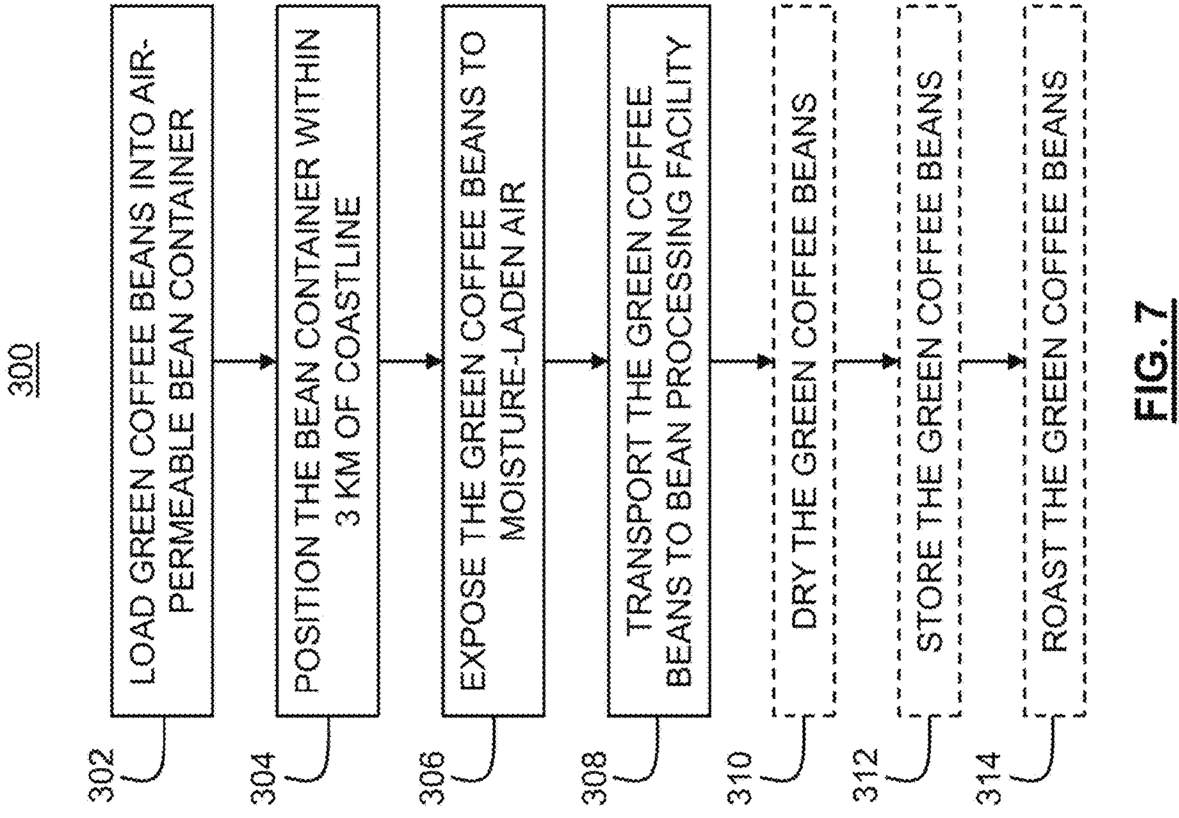
FIG. 7 is a flowchart illustrating another green coffee bean treatment process according to aspects of the teaching disclosed herein.

Reference is now made to FIG. 7, which illustrates another treatment process 300 for improving the taste characteristic of green coffee beans in accordance with aspects of the teaching disclosed herein. The treatment process 300 has some similarity to the treatment process 200 in that green coffee beans are exposed to inorganic salt.

At step 302, the treatment process includes loading green coffee beans into one or more air-permeable containers (e.g., sacks, bins, boxes, etc.). The air-permeable container permits air from the surrounding environment to be passed into the container and interact with the green coffee beans therein. For example, with reference to FIG. 8, green coffee beans are loaded into an air-permeable burlap sack 192. In some examples, the air-permeable container may be a drum without a lid.

In some examples, the treatment process 300 includes spreading green coffee beans in a single layer on a wire tray or other air-permeable tray. The tray is then loaded into the air-permeable container at step 302 (e.g., a box or other container which is perforated with small openings that allow moisture laden air to pass through and prevent egress of rain or pests). Arranging the green coffee beans in a single layer on an air-permeable tray has the advantage of increasing the flow rate of air around the individual green coffee beans and thereby facilitates an efficient exposure to moisture-laden air at step 306.

At step 304, the treatment process includes positioning the one or more air-permeable bean containers within 3 km of a coastline of a body of natural salt water. The body of natural salt water may be either a body of brackish water or a body of saline water (e.g., an ocean, sea, brackish lake, brackish marsh, estuary, etc.). As used herein, a body of brackish water refers to any body of water having a total dissolved salt concentration between 3,000 mg/L and 10,000 mg/L.

As used herein, a body of saline water refers to any body of water having a total dissolved salt concentration over 10,000 mg/L. In some examples, the one or more air-permeable containers may be positioned between 0 m and 1000 m inland from the coastline. More preferably, the one or more air-permeable bean containers may be positioned between 0 and 100 m inland from the coastline. In some examples, the one or more air-permeable bean containers may be positioned on a pier, dock, or boat that is on the water. Proximity to the coastline increases the saltwater concentration in the ambient air and increases the average wind speeds from the sea/ocean. All else being equal, the closer in proximity to the coastline, the higher the concentration of natural sea salt in the air.

Figure 8:
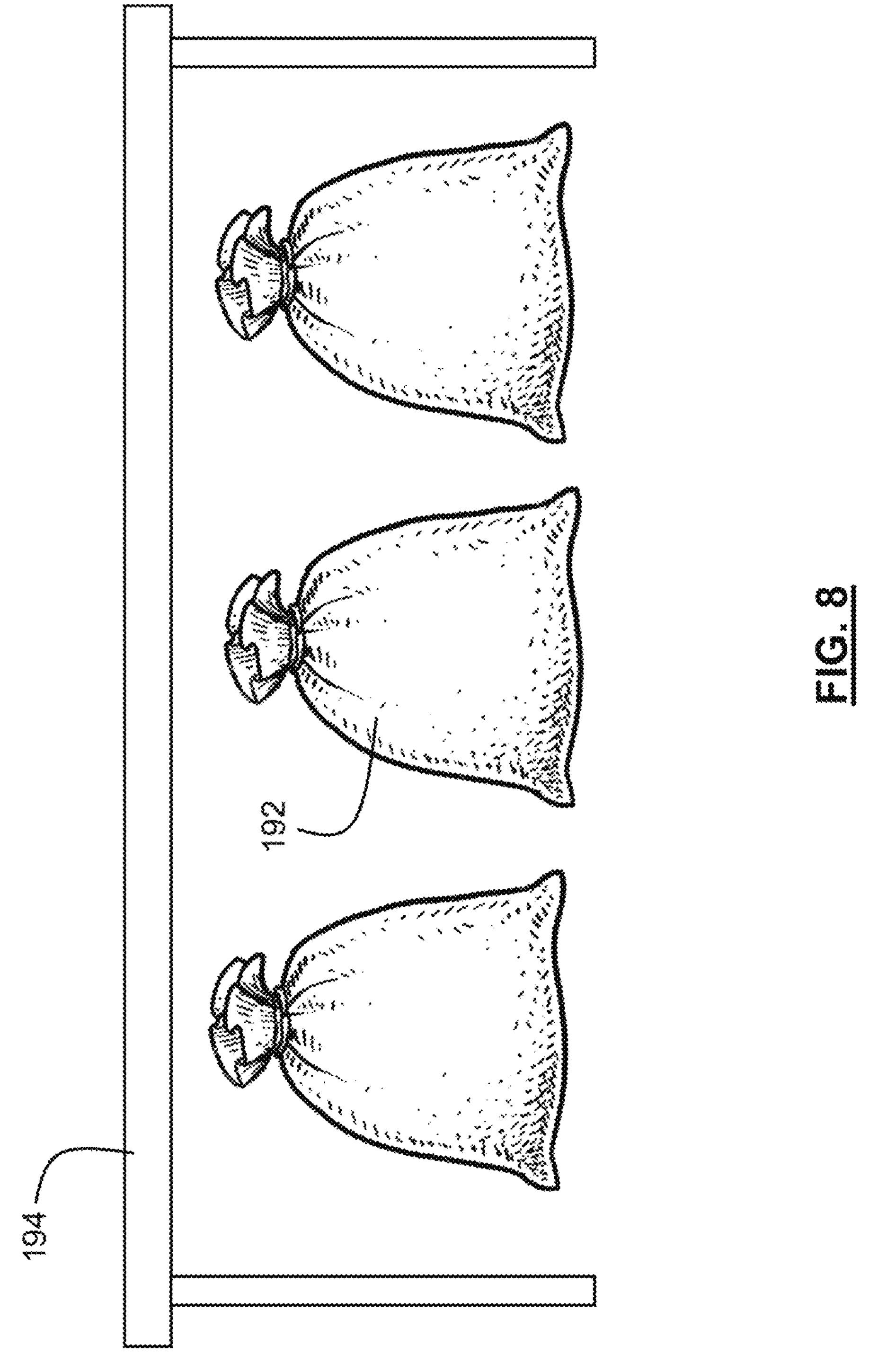
FIG. 8 is a schematic illustration of multiple coffee bean containers positioned in a rain shelter.

With reference to FIG. 8, step 304 may optionally include locating the one or more air-permeable containers 192 in a rain shelter 194. The rain shelter 194 may protect the green coffee beans and/or the air-permeable bean containers from precipitation. Alternatively, or in addition, the rain shelter 194 may protect the green coffee beans from tampering or theft. For example, the rain shelter 194 may impede the access of pests (e.g., dogs, birds, squirrels, etc.) to the green coffee beans.

At step 306, the treatment process includes exposing the green coffee beans held in the one or more air-permeable containers to moisture-laden air comprising natural inorganic salt for an exposure duration of at least 1 week. Step 306 is performed after the one or more air permeable containers are positioned within 1 km of the coastline at step 304. Moisture-laden air near the coastline comprises natural sea salt (which is generally made up of at least 90% NaCl, along with some other inorganic minerals, such as phosphorus, zinc, iron, and silicon, for example).

Step 306 may include absorbing at least some of the natural sea salt of the moisture-laden air into the green coffee beans. The air-permeable containers allow for the exchange of air between the green coffee beans held therein and the surrounding environment. As a result, the moisture-laden air can pass into the air-permeable containers and be at least partially absorbed by the green coffee beans held therein.

In some examples, the exposure duration is between 1 week and 5 months. More preferably, the exposure duration is between 1 month and 3 months. During the exposure duration at step 306, the green coffee beans are exposed to at least 150 humidity hours of moisture-laden air. As used herein, "humidity hours" is the number of hours of exposure to a relative humidity over 55%. In some examples, the green coffee beans are exposed to at least 250 humidity hours (e.g., at least 300 humidity hours, at least 350 humidity hours, or more) during step 306.

The exposure duration may be set to ensure that the green coffee beans absorb an adequate amount of inorganic salt from the moisture-laden air. If the exposure duration is too short, there may be an insufficient amount of inorganic salt present in the green coffee beans at the time of roasting to suppress and/or mask the bitter flavours. Too long of an exposure duration may be inefficient (waste time). In some examples, step 306 includes exposing the green coffee beans to the moisture-laden air until the green coffee beans contain at least a target quantity of inorganic salt (e.g., at least 0.3% inorganic salt by mass, at least 0.4% inorganic salt by mass, at least 0.5% inorganic salt by mass).

At step 308, the treatment process includes transporting the green coffee beans to a bean processing facility. Step 308 is performed after the green coffee beans held in the one or more air-permeable containers are exposed to moisture-laden air at step 306. The green coffee beans may be transported to the bean processing facility in any suitable fashion (e.g., by truck, train, ship, etc.). The green coffee beans may be transported to the bean processing facility within the one or more air-permeable containers. Alternatively, the green coffee beans may be removed from the one or more air-permeable containers and transferred to another bean container (e.g., vat, barrel, etc.) for transportation.

At step 310, the treatment process may optionally include drying the green coffee beans with a bean dryer at the bean processing facility. The green coffee beans may be moist after the exposure during step 306. Drying the green coffee beans with the bean dryer at step 310 may avoid microorganism growth. An example bean dryer 110 is shown schematically in FIG. 1. The bean dryer may be a fan oven, a convection dryer, an electric heater, a dehydrator, or any other powered device capable of drying the green coffee beans. In some cases, the moisture content of the green coffee beans is not high enough to generate concerns of microorganism growth, and no drying is required.

At step 312, the treatment process may optionally include storing the green coffee beans in a storage container at the bean processing facility. The storage container may be any suitable container for storing green coffee beans, such as, for example, a barrel, bag, vat, etc. An example storage container 190 is shown in FIG. 5.

Storing the green coffee beans at step 312 is performed after drying the green coffee beans with the bean dryer at step 310. As previously discussed, when the green coffee beans are not sufficiently dried before being put into the storage container, bacteria and/or mold may grow on the green coffee beans within the storage container (i.e., spoiling the green coffee beans). The green coffee beans are generally kept in a storage container until it is time for those green coffee beans to be roasted.

At step 314, the treatment process may optionally include roasting the green coffee beans in a bean roaster at the bean processing facility to produce roasted coffee beans. FIG. 9 illustrates roasted coffee beans 188. The bean roaster can be any suitable device for roasting green coffee beans. For the example, the bean roaster may be a drum roaster, hot-air roaster, centrifugal roaster, etc., that operate in either batch or continuous modes. An example bean roaster 114 is shown schematically in FIG. 1.

In some examples, roasting the green coffee beans at step 314 is performed after storing the green coffee beans at step 312. In some examples, roasting the green coffee beans at step 314 is performed after transporting the green coffee beans to the bean processing facility at step 308 without drying and storing the green coffee beans in between (i.e., steps 310 and 312 omitted). Such processes may be advantageous where the roasting at step 314 begins quickly after the green coffee beans are received at the bean processing facility (e.g., roasting begins within 48-96 hours of receiving the green coffee beans). Substantial microorganism growth on a moist green coffee bean does not typically begin until about 96 hours have elapsed. This duration is highly dependent on ambient temperature and moisture content of the green coffee beans, and may be lower in some cases (e.g., 48-72 hours).

Optionally, after step 314, the treatment process may include the roasted coffee beans 188 (FIG. 9) being packaged for sale to customers (e.g., coffee shops and/or direct to consumer).

What has been described above is intended to be illustrative of examples of the teaching disclosed herein, without limiting the scope of patent claims granted herefrom. The scope of such claims should be given the broadest interpretation consistent with the description as a whole.

ITEMS

Item 1: A treatment process for improving the taste characteristic of green coffee beans, comprising the steps of:
- loading the green coffee beans into one or more air-permeable bean container;
- positioning the one or more air-permeable bean containers within 1 km of a coastline of a body of natural salt water;
- after said positioning, exposing the green coffee beans held in the one or more air-permeable bean containers to moisture-laden air comprising natural inorganic salt for an exposure duration of at least 1 week; and
- after said exposing, transporting the green coffee beans to a bean processing facility.

Item 2: The treatment process of any preceding item, further comprising, after said transporting, drying the green coffee beans with a bean dryer at the bean processing facility.

Item 3: The treatment process of any preceding item, further comprising, after said drying, roasting the green coffee beans in a bean roaster at the bean processing facility to produce roasted coffee beans.

Item 4: The treatment process of any preceding item, further comprising, after said drying, storing the green coffee beans in a storage container at the bean processing facility.

Item 5: The treatment process of any preceding item, further comprising, after said storing, roasting the green coffee beans in a bean roaster at the bean processing facility to produce roasted coffee beans.

Item 6: The treatment process of any preceding item, wherein the exposure duration is between 1 week and 3 months.

Item 7: The treatment process of any preceding item, wherein said positioning comprises locating the one or more air-permeable bean containers in a rain shelter.

Item 8: The treatment process of any preceding item, wherein said exposing comprises absorbing at least some of the natural inorganic salt into the green coffee beans.

Item 9: The treatment process of any preceding item, wherein the green coffee beans are exposed to at least 150 humidity hours of the moisture-laden air across the exposure duration.

Item 10: A treatment process for improving the taste characteristic of green coffee beans, comprising the steps of:
- providing an aqueous solution of water and inorganic salt, the aqueous solution having a salt concentration of at least 0.1 mol/L;
- exposing the green coffee beans to the aqueous solution until a mass of the green coffee beans has increased by at least 1.5%;
- drying the green coffee beans with a bean dryer; and after said drying, storing the green coffee beans in a storage container.

Item 11: A treatment process for improving the taste characteristic of green coffee beans, comprising the steps of:

providing an aqueous solution of water and inorganic salt, the aqueous solution having a salt concentration of at least 0.1 mol/L;

exposing the green coffee beans to the aqueous solution until a mass of the green coffee beans has increased;

drying the green coffee beans with a bean dryer to produce dried green coffee beans comprising at least 0.3% inorganic salt by mass; and after said drying, storing the dried green coffee beans in a storage container.

Item 12: The treatment process of any preceding item, wherein prior to said exposing, the green coffee beans comprise less than 0.1% inorganic salt by mass.

Item 13: The treatment process of any preceding item, further comprising, after said storing, roasting the green coffee beans in a bean roaster to produce roasted coffee beans.

Item 14: The treatment process of any preceding item, wherein said storing has a storage duration of at least 24 hours.

Item 15: A treatment process for improving the taste characteristic of green coffee beans, comprising the steps of:

providing an aqueous solution of water and inorganic salt, the aqueous solution having a salt concentration of at least 0.1 mol/L;

exposing the green coffee beans to the aqueous solution until the green coffee beans comprise at least 0.3% inorganic salt by mass;

drying the green coffee beans with a bean dryer; and after said drying, roasting the green coffee beans in a bean roaster to produce roasted coffee beans.

Item 16: The treatment process of any preceding item, wherein before said exposing, the green coffee beans have a Q-Score below 80.

Item 17: The treatment process of any preceding item, wherein the roasted coffee beans have an Agtron™ color measurement between 0 and 49.

Item 18: The treatment process of any preceding item, further comprising, before said roasting, repeating said exposing and then repeating said drying.

Item 19: The treatment process of any preceding item, wherein said exposing comprises soaking the green coffee beans in the aqueous solution for a soaking duration of at least 15 seconds.

Item 20: The treatment process of any preceding item, further comprising, after said exposing, separating the green coffee beans from the aqueous solution.

Item 21: The treatment process of any preceding item, wherein said separating comprises draining the aqueous solution from a salt exposure tank containing the green coffee beans.

Item 22: The treatment process of any preceding item, wherein said soaking comprises continuously stirring the green coffee beans and the aqueous solution within a salt exposure tank.

Item 23: The treatment process of any preceding item, wherein the soaking duration is between 15 seconds and 30 minutes.

Item 24: The treatment process of any preceding item, wherein the soaking duration is between 5 minutes and 15 minutes.

Item 25: The treatment process of any preceding item, wherein said exposing comprises dipping the green coffee beans in the aqueous solution at least two times.

Item 26: The treatment process of any preceding item, wherein said dipping comprises submerging the green coffee beans in the aqueous solution and then separating the green coffee beans from the aqueous solution after a submersion duration.

Item 27: The treatment process of any preceding item, wherein the submersion duration is between 5 seconds and 1 minute.

Item 28: The treatment process of any preceding item, wherein said drying is performed after each dip of said dipping.

Item 29: The treatment process of any preceding item, wherein said exposing comprises spraying the green coffee beans with the aqueous solution.

Item 30: The treatment process of any preceding item, wherein the inorganic salt comprises one or more alkali salts.

Item 31: The treatment process of any preceding item, wherein the inorganic salt comprises one or more of sodium chloride (NaCl), potassium chloride (KCl), Magnesium chloride ($MgCl_2$), and calcium chloride ($CaCl_2$)).

Item 32: The treatment process of any preceding item, wherein said exposing comprises the green coffee beans absorbing at least some of the inorganic salt of the aqueous solution.

Item 33: The treatment process of any preceding item, wherein said drying comprises exposing the green coffee beans to air having an air temperature between 50° C. and 200° C.

Item 34: The treatment process of any preceding item, wherein said drying comprises exposing the green coffee beans to air having an air temperature between 80° C. and 150° C.

Item 35: The treatment process of any preceding item, wherein said drying has a drying duration of between 5 minutes and 120 minutes.

Item 36: The treatment process of any preceding item, wherein said drying has a drying duration of between 20 minutes and 70 minutes.

Item 37: The treatment process of any preceding item, further comprising, after said drying and before said roasting, storing the green coffee beans in a storage container.

Item 38: A treatment system for improving the taste characteristic of green coffee beans, the system comprising:

a green coffee bean hopper having a bean storage volume, and a bean hopper outlet downstream of the bean storage volume;

a salt infuser positioned downstream of the bean hopper outlet, the salt infuser comprising an aqueous inorganic salt solution reservoir, wherein the salt infuser is configured to expose green coffee beans received from the bean hopper outlet to the contents of the aqueous inorganic salt solution reservoir; and a bean dryer positioned downstream of the salt infuser.

Item 39: The treatment system of any preceding item, wherein the aqueous inorganic salt solution reservoir is a salt exposure tank having a tank volume in which the green coffee beans are held for an exposure duration.

Item 40: The treatment system of any preceding item, wherein the salt exposure tank comprises a bean stirrer that, when activated, mixes the contents of the tank volume.

Item 41: The treatment system of any preceding item, wherein the salt exposure tank has a tank bean outlet positioned downstream of the tank volume, and the treatment system further comprises a bean collection tray positioned downstream of the tank bean outlet.

Item 42: The treatment system of any preceding item, wherein the salt exposure tank comprises a tank open upper end that provides access to the tank volume, and the salt infuser further comprises a bean dipper that, when activated, repeatedly dips the green coffee beans into the tank volume from the tank open upper end.

Item 43: The treatment system of any preceding item, wherein the bean dipper comprises:

a liquid permeable bean dipping enclosure; and an actuator connected to the bean dipping enclosure, wherein the actuator, when activated, is configured to move the bean dipping enclosure between a bean dipped position and a bean removed position, wherein the bean dipped position is at a lower elevation than the bean removed position, and the bean dipped position is within the salt exposure tank.

Item 44: The treatment system of any preceding item, wherein the salt exposure tank comprises an aqueous solution drain valve fluidly connected to the tank volume.

Item 45: The treatment system of any preceding item, wherein the salt infuser comprises:

an aqueous solution sprayer having a nozzle fluidly connected to the aqueous inorganic salt solution reservoir.

Item 46: The treatment system of any preceding item, further comprising a bean conveyor positioned downstream of the hopper bean outlet and upstream of the aqueous solution sprayer.

Item 47: The treatment system of any preceding item, further comprising a bean storage container positioned downstream of the bean dryer.

Item 48: The treatment system of any preceding item, further comprising a bean roaster positioned downstream of the bean dryer.

Item 49: A roasted coffee bean comprising at least 0.3% inorganic salt by mass.

Item 50: The roasted coffee bean of any preceding item, comprising between 0.3% to 1.0% inorganic salt by mass.

Item 51: The roasted coffee bean of any preceding item, comprising an Agtron™ color measurement between 0 and 49.

Item 52: The roasted coffee bean of any preceding item, wherein the inorganic salt comprises sodium chloride (NaCl).

Item 53: A retail package comprising at least 400 grams of the roasted coffee beans of any preceding item.

Item 54: The retail package of any preceding item, wherein the roasted coffee beans are ground.

The invention claimed is:

1. A treatment process for improving a taste characteristic of green coffee beans, comprising the steps of:

providing an aqueous solution consisting essentially of water and inorganic salt, the aqueous solution having a salt concentration of at least 0.1 mol/L, wherein the inorganic salt is one or more of sodium chloride, potassium chloride, magnesium chloride, and calcium chloride;

exposing the green coffee beans to the aqueous solution until a mass of the green coffee beans has increased, wherein said exposing comprises immersing the green coffee beans in a pool of the aqueous solution;

drying the green coffee beans with a bean dryer to produce dried green coffee beans comprising at least 0.3% inorganic salt by mass and less than 10% moisture by mass; and after said drying, storing the dried green coffee beans in a storage container.

2. The treatment process of claim 1, wherein said immersing is performed for an immersion duration of at least 15 seconds.

3. The treatment process of claim 2, further comprising, after said immersing, separating the green coffee beans from the aqueous solution.

4. The treatment process of claim 3, wherein said immersing comprises immersing the green coffee beans in a salt exposure tank containing the pool of the aqueous solution and said separating comprises draining the aqueous solution from the salt exposure tank containing the green coffee beans.

5. The treatment process of claim 2, wherein said immersing comprises immersing the green coffee beans in a salt exposure tank containing the pool of the aqueous solution and continuously stirring the green coffee beans and the aqueous solution within the salt exposure tank.

6. The treatment process of claim 1, wherein said exposing comprises immersing the green coffee beans in the aqueous solution at least two times.

7. The treatment process of claim 6, wherein said immersing comprises submerging the green coffee beans in the aqueous solution and then separating the green coffee beans from the aqueous solution after a submersion duration.

8. The treatment process of claim 1, wherein said exposing comprises the green coffee beans absorbing at least some of the inorganic salt of the aqueous solution.

9. The treatment process of claim 1, wherein before said exposing, the green coffee beans have a Q-Score below 80.

10. The treatment process of claim 1, wherein said drying comprises exposing the green coffee beans to air having an air temperature between 50° C. and 200° C.

11. The treatment process of claim 1, further comprising, after said storing, roasting the green coffee beans in a bean roaster to produce roasted coffee beans.

12. The treatment process of claim 1, wherein:

said exposing wets an exterior of the green coffee beans with the aqueous solution; and said drying begins while the exterior of the green coffee beans is still wetted with the aqueous solution from said exposing.

* * * * *